United States Patent [19]
Walters

[11] Patent Number: 5,096,756
[45] Date of Patent: Mar. 17, 1992

[54] COMPOSITE BLADDER FOR GAME BALLS

[75] Inventor: Peter J. Walters, Roselle, Ill.

[73] Assignee: Wilson Sporting Goods Co., River Grove, Ill.

[21] Appl. No.: 502,798

[22] Filed: Apr. 2, 1990

[51] Int. Cl.$^5$ .............................................. B65D 30/24
[52] U.S. Cl. ................................. 428/35.5; 428/35.4; 428/36.6; 525/123; 525/131; 273/DIG. 5; 273/DIG. 6; 273/65 B
[58] Field of Search ............... 428/35.4, 35.5, 36.6; 273/65 A, 65 B, 65 E, 65 ED, DIG. 5, DIG. 8; 525/123, 131

[56] References Cited

U.S. PATENT DOCUMENTS 3,882,191 5/1975 Belatoni et al. ............... 260/859 PV
4,169,594 10/1979 Crane ................................ 428/36.6
4,513,058 4/1985 Martin ............................. 273/65.3

FOREIGN PATENT DOCUMENTS 61-120820 5/1989 Japan .
2000721 1/1979 United Kingdom .
2157575 3/1988 United Kingdom .

OTHER PUBLICATIONS

Polymer Handbook, 3rd Edition, J. Brandup & Immergut, J. Wiley and Sons, Inc., 1989, Ref. II, V-62.
Handbook of Common Polymers, Roff and Scott, Fibres, Films, Plastics, and Rubbers, Butterworth and Co., Ltd., 1971, Ref. I, p. 453.

Primary Examiner—Ellis P. Robinson
Assistant Examiner—Rena L. Dye

[57] ABSTRACT

A bladder for a game ball is formed from a composite film which is made from a mixture of polyurethane and polyvinylchloride.

5 Claims, 1 Drawing Sheet

Fig. 1
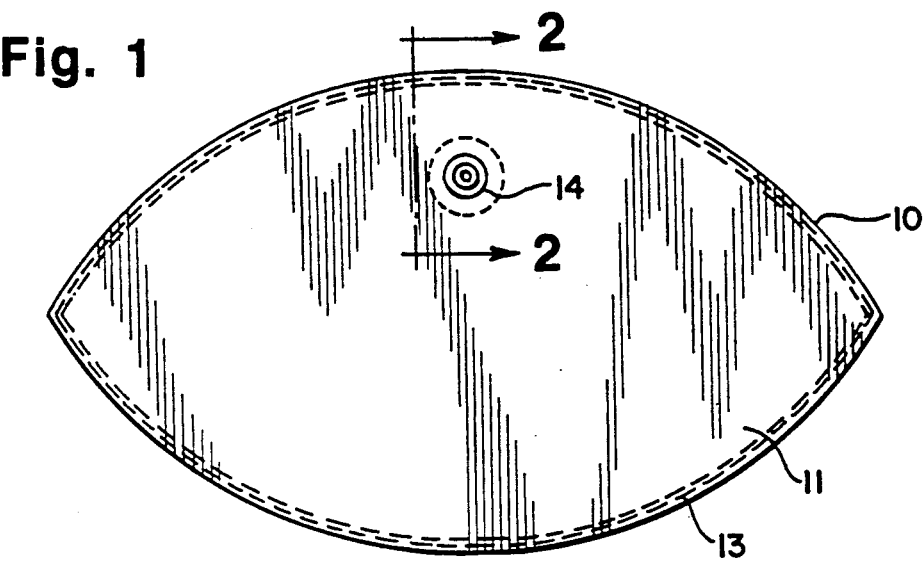
Fig. 2
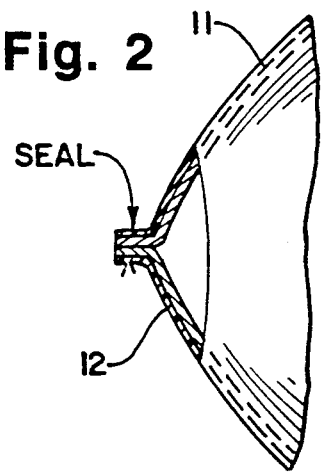
Fig. 4 PRIOR ART
Fig. 5
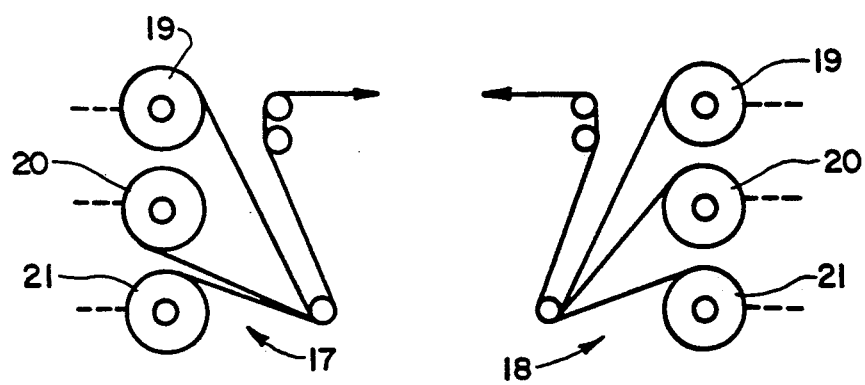
Fig. 3 PRIOR ART

COMPOSITE BLADDER FOR GAME BALLS

BACKGROUND

This invention relates to bladders for game balls, and, more particularly, to a bladder which is formed from a single layer of film which is comprised of polyurethane and polyvinylchloride.

Sport balls, such as American-style footballs, soccerballs, and volleyballs, are constructed with an inner bladder that is inflated with air. The inflation of the bladder gives the sport ball its shape. When impacted, the bladder's resiliency allows the energy that is introduced to be returned. This return in energy propels the ball away from the point of impact.

For a sport ball 200 years ago, pig intestine was a suitable bladder material due to its elastic nature. With the introduction of rubber materials about 150 years ago, this material proved to be far superior material than an animal's intestine because of its increased durability and air retention characteristics.

Until recently, butyl rubber was the industry standard for the construction of sport ball bladders. Of the many synthetic and natural rubber compounds available, butyl rubber was the best choice because of its low gas transmission and good tensile strength and elasticity. Butyl rubber has been used for many years as the material in inner tubes for auto and bicycle tires.

Drawbacks to butyl rubber bladders include their expense due to its labor-intensive operation and capital-intensive requirements. Production of butyl rubber bladders is a dirty operation. Due to the porosity of the material, multiple layers are usually incorporated to safe guard against pin-hole leaks. Also, because of the softness of the material, butyl bladders result in high defective rates (15-20%) from leaks caused by a stray lacing awl or sewing needle which are used to shut the opening on a sport ball.

With the introduction of new thermoplastic elastomer films—specificially polyurethane—in the last 15 years, superior thermoplastic elastomer films can be purchased from film converters in a cured state. The film may be easily constructed into a bladder by heat- or radio-frequency sealing two or more layers and die-cutting the sealed layers to the desired shape.

Other thermoplastic elastomer materials for use in bladders include low-density polyethylene, polyvinylchloride, ethylene-vinyl-acetate, copolyester, polyamide, and polyethylene terapthalate. Of the thermoplastic films mentioned, thermoplastic, polyurethane (TPU) proved the best because of its excellent tensile strength, abrasion resistance, stretchability, durability and air retention properties. TPU materials are generally classified by the polyol used in its formulation. The two most common TPU films are polyester-type and polyether-type. The polyester-type TPU film has proven to be the new industry standard for bladders over the polyether-type TPU film because of its lower cost, superior tensile properties and durability, and lower gas transmission rate.

Since the early 1980's, polyester-type TPU film has been used in the production of bladders for sport balls. The problem is that polyester-type TPU materials are susceptible to hydrolysis which results in the air leaking through a hole in the bladder. Hydrolysis is the condition where water and stress result in the breakdown along the carbon chain found in the polymer. This hydrolysis phenomena is caused by the carbon atoms separating within the polyurethane molecule which results in microscopic tears (less than 1/64 inch) in the film and a passage for the pressurized air in the bladder to leak out.

Polyether-type TPU film exhibit the same tensile strength and durability as polyester-type TPU films. However, the air retention characteristics of the film is not acceptable as a bladder. Polyether-type TPU films do exhibit anti-hydrolysis properties. Although multiple pin-hole leaks are possible, the tear generally does not grow over 1/64 inch in length because the internal air pressure is greatly reduced once the leak begins and results in a reduction in stress on the films. Both water and stress are needed to propagate and continue the hydrolytic tear. An anti-hydrolysis urethane film was made by adding a dissimilar material that protects the urethane from the hydrolytic reaction. Adding an outer protective layer to the bladder construction greatly reduces the amount of water that can attack the polyester-type urethane inner layers. Materials that protect the inner urethane layer exhibit very low water transmission rates (less than 8 gram/mil/100 sq.in./24 hr). Specific materials with very low water transmission rates are polyvinylchloride, low density polyethylene, linear low density polyethylene, and ethylene-vinyl-acetate. These materials were also considered as protective films because of their flexibility (less than 10,000 psi flexural modulus) and stretchability (greater than 200% ultimate elongation).

Of the protective materials mentioned, only polyvinylchloride (PVC) was able to seal to the polyester-type TPU material in a multi-layer construction. Because the chemistries are similar and because they both are receptive to radio frequency sealing, the polyvinylchloride and polyester-type TPU combination was the best choice. Polyvinylchloride does not seal well, even to itself, using heat methods. The other low gas transmission rate films mentioned, all polyolefiln types, do not seal well using radio frequency method. Heat sealing is the transfer of heat from a source in order to melt the thermoplastic film layers, allow the polymers to flow, and cool to become one polymer in the sealed area. Radio-frequency sealing is the same procedure, only the molecular structure of the polymer is excited by radio waves that result in the polymer turning molten.

In testing, a polyester-type TPU bladder would leak, due to hydrolysis tearing, within 7 days when soaked in water for fifteen minutes and mechanically impacted 100,000 times. For a sport ball bladder constructed from a triple laminate of 5 mils of TPU, 7 mils of polyvinylchloride, and 5 mils of TPU, no failure due to leakage was witnessed after six months of observation. The test included the same water exposure and mechanical impacting as used in the TPU bladder test.

The outer layer of 5 mil polyester-type TPU film was found to provide an abrasion-resistant protective layer for the softer polyvinylchloride layer. The dimensions of 5-7-5 mils of the plies in this 3-ply film prove important in the processing and durability. Because the polyvinyl film exhibits lower tensile strength and ultimate elongation than the polyester-type TPU film, two additional mils were needed. The thicker polyvinylchloride film also resists cracking during impacting.

In the process of constructing a bladder, a sheet of material containing three total layers is formed. An injection molded valve of polyester-type TPU resin is placed in a die cut hole and sealed in place through heat- or radio-frequency methods. A second sheet formed from three layers of film is placed on top of the first sheet and all six layers of film are sealed at the periphery of the bladder by heat- or radio-frequency methods. Steel-rule-die blades cut through the layers of film on the outer edge of the seal to remove excess material.

SUMMARY OF THE INVENTION

The invention provides a bladder which is formed from a single film which is a composite of thermoplastic polyurethane and polyvinylchloride. The composite can be formed either by combining polyurethane resin and polyvinylchloride resin or by combining pieces of polyurethane film and polyvinylchloride film. The combined polyurethane and polyvinylchloride is mixed and heated, and a single composite film is formed, e.g., by blown film extrusion. The bladder is formed by sealing overlapping sheets of the composite film in the desired shape. The single-thickness composite film is not subject to delamination and exhibits excellent anti-hydrolytic, gas transmission, and durability properties. The single ply film is also cheaper and easier to process than the three ply material.

DESCRIPTION OF THE DRAWING

The invention will be explained in conjunction with an illustrative embodiment shown in the accompanying drawing, in which FIG. 1 is a plan view of a football bladder which is formed in accordance with the invention;

FIG. 2 is a fragmentary sectional view showing the periphery of the bladder in an expanded condition;

FIG. 3 is a schematic view illustrating the formation of prior art bladders from two sheets of triple ply films;

FIG. 4 is a fragmentary sectional view of a prior art triple ply sheet of polyurethane-polyvinylchloride-polyurethane films; and FIG. 5 is a fragmentary sectional view of a single ply composite film formed in accordance with the invention.

DESCRIPTION OF SPECIFIC EMBODIMENTS

Excess material from the prior art bladder which was formed from three-ply sheets of polyurethane-polyvinylchloride-polyurethane was initially considered contaminated by scrap film processors. However, I have found that re-extrusion of the excess material produces a product that is as resistant to hydrolysis as the prior art three-ply bladder. Re-extrusion is accomplished by grinding the scrap three-ply material into pieces about ¼ inch by ¼ inch and reprocessing by standard blown film extrusion into a new single ply composite film. Blending of the polyester-type thermoplastic polyurethane and the polyvinylchloride during the extrusion process is believed to result in the polyvinylchloride encapsulating the polyurethane along with a change in the polarity of the polyurethane which results in the polyurethane being less susceptible to hydrolytic attack.

In one specific embodiment of the invention a blend of ground scrap film material consisted of 43% by weight polyvinylchloride and 57% by weight polyester-type TPU. The density of the polyvinylchloride was 1.30 grams/cc, and the density of the TPU was 1.21 grams/cc. The blended material was extruded into a composite single ply film having a thickness of 10 mils. Two sheets of the composite film were used to form a bladder in the conventional manner by superimposing the sheets and sealing the two sheets together around the periphery of the bladder by heat or RF sealing. The resulting bladder proved to be as durable and as hydrolytic-resistant as the prior art three ply bladder.

Another embodiment of the invention used virgin polyester-type TPU and polyvinylchloride resins rather than grinding scrap TPU and polyvinylchloride film. The same percentage of materials using virgin resins is heated and extruded by conventional blown film extrusion to form a composite single ply film. Bladders formed from the composite film using virgin resins provide the same results as the prior art three ply bladder and the bladder formed from reground films.

Referring to FIGS. 1 and 2, the numeral 10 designates a football bladder which is formed from two sheets 11 and 12 of a single ply composite film formed from a blend of polyester-type TPU and polyvinylchloride. The two sheets are sealed together around their periphery by a seal 13 which is obtained by conventional heat or radio frequency sealing methods. A conventional inflating valve 14 is inserted through an opening in the sheet 11 and sealed thereto in the conventional manner. FIG. 5 is a cross section of one of the sheets 11 and 12 which shows the composite, single ply nature of the sheet.

The composite, single ply nature of the sheets 11 and 12 is distinguished from the three-ply sheet 15 illustrated in FIG. 4 which consists of a middle layer of polyvinylchloride and two outer layers of polyester-type TPU. FIG. 3 illustrates the manner in which the prior art three-ply sheets are formed in order to provide two superposed sheets which are used to form the bladder. Two roll stands 17 and 18 each include three separate rolls 19, 20, and 21 of clear urethane, black vinyl, and clear urethane, respectively. The plies are not secured together except at the periphery of the bladder which is formed by the heat seal or RF seal.

The outer ply of TPU of the sheet 15 is provided for abrasion resistance. However, the outer ply is subject to hydrolysis and can develop air leaks, thereby reducing the overall resistance to air permeability of the three-ply sheet.

In constrast to the three-ply sheet 15, the single ply composite sheets 11 and 12 have uniform resistance to hydrolysis and resistance to abrasion throughout the thickness of the sheet. Since the sheet is extruded as an integral, composite sheet, the sheet is not subject to delamination. The single ply composite sheet exhibits surprising mechanical properties, and the tensile strength and elongation of the composite sheet are not substantially less than pure polyurethane sheets even though the composite sheet incorporates polyvinylchloride, which has significantly lower tensile strength and elongation than polyurethane.

In one test ten specimens were cut from a composite sheet extruded from a blend of virgin polyurethane and virgin polyvinylchloride resins with a one half inch wide dogbone-shaped die. The blend of resins contained 57% by weight of polyurethane and 43% by weight of polyvinylchloride. Five specimens were cut from the sheet in the machine direction (MD), and five specimens were cut in the transverse direction (TD). The thickness of the specimens ranged from 0.009 to 0.012 inch. The specimens were tested for tensile strength and percent elongation using a four inch gauge length and a cross head speed of ten inches per minute. The average tensile strength and percent elongation of the specimens are shown in Table I.

TABLE I

| Specimen | Tensile Strength (PSI) | Percent Elongation |
|---|---|---|
| MD | 7194 | 489 |
| TD | 5799 | 451 |

In another test a single ply composite sheet was formed from reground scrap material which had been used to form a three-ply polyurethane-polyvinylchloride-polyurethane sheet. The test results are shown in Table II.

TABLE II

| | MD | | | | TD | | |
|---|---|---|---|---|---|---|---|
| Thickness | (Lbs.) | Tensile Strength | Percent Elongation @ Break | Thickness | (Lbs.) | Tensile Strength | Percent Elongation @ Break |
| .0049 | 15.0 | 6122 | 357 | .0048 | 14.6 | 6083 | 360 |
| .0049 | 10.3 | 4204 | 280 | .0049 | 14.2 | 5796 | 368 |
| .0050 | 16.4 | 6560 | 370 | .0050 | 13.1 | 5240 | 326 |
| | | | MEAN | | | | |
| .0049 | 13.9 | 5629 | 336 | .0049 | 14.0 | 5706 | 351 |

The foregoing results can be compared with commercial product material specifications for polyurethane and polyvinylchloride which were used to make commercial three-ply bladders as shown in Table III.

TABLE III

| Test | Specification for Polyurethane | Specification for Polyvinylchloride |
|---|---|---|
| Thickness | .005" ± .0005 | .007" ± .0005 |
| Tensile | 7000 PSI minimum | 2000 PSI minimum |
| % Elongation @ Break | 300% minimum | 200% minimum |

The composite sheet, whether formed from virgin resins or reground scrap, has leak resistance and abrasion resistance which are comparable to that of the three-ply sheet, and the composite sheet is easier and cheaper to process. Further, satisfactory results can be obtained from composite sheets which use less material than is used in the three-ply sheets. The preferred thickness for the composite sheet is about 0.010 inch compared to the total thickness of 0.017 inch for the 5-7-5 mil three-ply sheet. It is believed that satisfactory results can be obtained from the composite sheet with a thickness as low as 0.004 inch, and thicknesses greater than 0.010 inch, for example, up to 0.020 inch, can be used if additional leak resistance and durability is desired.

The amount of polyurethane which is used to form the composite sheet can range from about 55% to 65% by weight, and the amount of polyvinylchloride can range from about 35% to about 45% by weight. The density of the polyurethane is preferably within the range of 1.20 to 1.23 grams/cm$^3$, and the density of the polyvinyl-chloride is preferably within the range of about 1.29 to 1.35 grams/cm$^3$. One specific polyurethane which has been used is a polyester-type thermoplastic polyurethane available from B. F. Goodrich under the name Estane 58277. This material had a hardness of 50 Shore D. One specific polyvinylchloride material was a plasticized thermoplastic polyvinylchloride having Sanisizer 7-11 plasticizer. The polyvinylchloride had a hardness of 70 to 80 Shore A.

While in the foregoing specification a detailed description of specific embodiments of the invention was set forth for the purpose of illustration, it will be understood that many of the details herein given may be varied considerably by those skilled in the art without departing from the spirit and scope of the invention.

I claim:

1. An inflatable bladder for a game ball, the bladder comprising a composite single ply film formed from a mixture of thermoplastic polyester polyurethane and polyvinylchloride.

2. The bladder of claim 1 in which the thickness of the film is within the range of 0.004–0.020 inch.

3. The bladder of claim 1 in which said mixture contains from about 55 to 65 percent by weight of polyurethane and from about 35 to 45 percent by weight of polyvinylchloride.

4. The bladder of claim 3 in which the density of the polyurethane is within the range of 1.20–1.23 gr/cm$^3$ and the density of the polyvinylchloride is within the range of 1.29–1.35 gr/cm$^3$.

5. An inflatable bladder for a game ball, the bladder comprising a pair of bladder portions which are sealed together around their peripheries, each of the bladder portions comprising a composite single ply film formed from a mixture of thermoplastic polyester polyurethane and polyvinylchloride.

* * * * *